United States Patent
Xu et al.

(10) Patent No.: US 9,261,754 B2
(45) Date of Patent: Feb. 16, 2016

(54) PARALLEL AND WDM SILICON PHOTONICS INTEGRATION IN INFORMATION AND COMMUNICATIONS TECHNOLOGY SYSTEMS

(71) Applicant: Telefonaktiebolaget L M Ericsson (publ), Stockholm (SE)

(72) Inventors: Qing Xu, Montreal (CA); Robert Brunner, Montreal (CA); Stephane Lessard, Mirabel (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 189 days.

(21) Appl. No.: 14/106,359

(22) Filed: Dec. 13, 2013

(65) Prior Publication Data

US 2015/0168803 A1 Jun. 18, 2015

(51) Int. Cl.
G02B 6/26 (2006.01)
G02F 1/35 (2006.01)
G02F 1/365 (2006.01)
G02B 6/12 (2006.01)
H04J 14/02 (2006.01)
G02F 2/00 (2006.01)

(52) U.S. Cl.
CPC ............ G02F 1/353 (2013.01); G02B 6/12007 (2013.01); G02F 1/365 (2013.01); G02F 2/004 (2013.01); H04J 14/0212 (2013.01); *G02F 2002/006* (2013.01)

(58) Field of Classification Search
None
See application file for complete search history.

(56) References Cited

U.S. PATENT DOCUMENTS

| | | | | | |
|---|---|---|---|---|---|
| 5,175,777 | A | * | 12/1992 | Bottle | 385/17 |
| 5,724,167 | A | * | 3/1998 | Sabella | 398/50 |
| 6,028,977 | A | * | 2/2000 | Newsome | 385/147 |
| 6,115,517 | A | | 9/2000 | Shiragaki et al. | |
| 6,411,752 | B1 | * | 6/2002 | Little et al. | 385/17 |
| 7,200,299 | B1 | * | 4/2007 | Earnshaw | 385/17 |

(Continued)

FOREIGN PATENT DOCUMENTS

WO 2009060754 A1 5/2009

OTHER PUBLICATIONS

Kokubun, Y., "Vertically Coupled Microring Resonator Filter for Integrated Add/Drop Node", IEICE Transactions on Electronics, vol. E88-C, No. 3, Mar. 2005, pp. 349-362.

(Continued)

*Primary Examiner* — Mike Stahl
(74) *Attorney, Agent, or Firm* — Murphy, Bilak & Homiller, PLLC

(57) ABSTRACT

A wavelength converter includes first silicon waveguides and second silicon waveguides intersecting the first silicon waveguides to form an arrayed waveguide. The arrayed waveguide receives optical data signals at the same wavelength at a first input and optical pump signals at different wavelengths at a second input. Microring resonators evanescently couple different ones of the first silicon waveguides to different ones of the second silicon waveguides. Each microring resonator is tuned to the wavelength of the optical data signals or one of the wavelengths of the optical pump signals, so that different combinations of the optical data signals and the optical pump signals are provided at an output of the arrayed waveguide. A non-linear optical media converts the wavelength of each combined optical signal at the output of the arrayed waveguide to yield wavelength converted signals each having a new dedicated wavelength.

23 Claims, 13 Drawing Sheets

(56) References Cited

U.S. PATENT DOCUMENTS

| | | | | |
|---|---|---|---|---|
| 2003/0185495 | A1* | 10/2003 | Baron et al. | 385/18 |
| 2006/0008272 | A1* | 1/2006 | Abeles | 398/48 |
| 2012/0251042 | A1* | 10/2012 | Julien et al. | 385/17 |
| 2013/0089888 | A1 | 4/2013 | Woodward et al. | |
| 2015/0015937 | A1* | 1/2015 | Vermeulen et al. | 359/327 |

OTHER PUBLICATIONS

Razaghi, M. et al., "Numerical Analysis of Wavelength Conversion Based on Semiconductor Optical Amplifier Integrated with Microring Resonator Notch Filter", 2011 11th International Conference on Numerical Simulation of Optoelectronic Devices (NUSOD), IEEE, Sep. 2011, pp. 101-102.

Chen, L. et al., "Compact Bandwidth-Tunable Microring Resonators." Optics Letters, Nov. 15, 2007, pp. 3361-3363, vol. 32, No. 22, Optical Society of America.

Gerstel, O., et al., "Elastic Optical Networking: A New Dawn for the Optical Layer?" IEEE Communications Magazine, Feb. 2012, pp. s12-s20, vol. 50, No. 2, IEEE Communications Society.

Koonath, P., et al., "Monolithic 3-D Silicon Photonics." Journal of Lightwave Technology, Apr. 2006, pp. 1796-1804, vol. 24, No. 4.

Lacey, J.P.R., et al. "Tunability of Polarization-Insensitive Wavelength Converters Based on Four-Wave Mixing in Semiconductor Optical Amplifiers." Journal of Lightwave Technology, Dec. 1998, pp. 2419-2427, vol. 16, No. 12.

Lee, B.G., et al., "Demonstration of Broadband Wavelength Conversion at 40 Gb/s in Silicon Waveguides." IEEE Photonics Technology Letters, Feb. 1, 2009, pp. 182-184, vol. 21, No. 3, IEEE Photonics Society.

Little, B., et al., "Tunable Bandwidth Microring Resonator Filters." 34th European Conference on Optical Communication, Sep. 21-25, 2008, pp. 1-2, Brussels.

Ophir, N., et al., "Continuous Wavelength Conversion of 40-Gb/s Data Over 100 nm Using a Dispersion-Engineered Silicon Waveguide." IEEE Photonics Technology Letters, Jan. 15, 2011, pp. 73-75, vol. 23, No. 2, IEEE Photonics Society.

Ophir, N., et al., "Silicon Photonic Microring Links for High-Bandwidth-Density, Low-Power Chip I/O." IEEE Micro, Jan.-Feb. 2013, pp. 54-67, vol. 33, No. 1, IEEE Computer Society.

Osgood, R., et al., "Nonlinear Silicon Photonics." May 11, 2010, pp. 1-2, International Society for Optics and Photonics. Available at <https://spie.org/x40198.xml>.

Pasquazi, A., et al., "All-Optical Wavelength Conversion in an Integrated Ring Resonator." Optics Express, Feb. 15, 2010, pp. 3858-3863, vol. 18, No. 4. Optical Society of America.

Rabus, D.G. "Chapter 2: Ring Resonators: Theory and Modeling" Integrated Ring Resonators: The Compendium. 2007, pp. 3-40, Springer Series in Optical Sciences, vol. 127.

Stampoulidis, L., et al., "Microring-Resonator-Assisted, All-Optical Wavelength Conversion Using a Single SOA and a Second-Order Si3N4—SiO2 ROADM." Journal of Lightwave Technology, Feb. 15, 2010, pp. 476-483, vol. 28, No. 4, IEEE Aerospace and Electronic Systems Society.

Xu, Q., et al. "Tunable SOA Wavelength Converter for Optical Packet Switching Router." 23rd Annual Meeting of the IEEE Photonics Society. Nov. 7-11, 2010, pp. 624-625, Denver, CO.

Xu, L., et al. "Simultaneous Wavelength Conversion of ASK and DPSK Signals Based on Four-Wave-Mixing in Dispersion Engineered Silicon Waveguides." Optics Express, Jun. 8, 2011, pp. 12172-12179, vol. 19, No. 13, Optical Society of America.

* cited by examiner

PARALLEL AND WDM SILICON PHOTONICS INTEGRATION IN INFORMATION AND COMMUNICATIONS TECHNOLOGY SYSTEMS

TECHNICAL FIELD

The present invention generally relates to information and communications technology systems, and more particularly relates to parallel and WDM photonics integration for information and communications technology systems.

BACKGROUND

In large scale information and communication technology (ICT) systems, such as datacenter networks, optical interconnects, especially silicon photonics, are enabling technologies that offer various advantages such as high bandwidth, high density, compactness, low cost, low power consumption, compatibility with mature CMOS (complementary metal oxide semiconductor) processes, monolithic integration, etc. Grey light (i.e. single wavelength) parallel silicon photonics is highly cost effective for very short reach applications such as chip-to-chip, module-to-module and linecard-to-linecard interconnects. Grey light parallel silicon photonics can extend the reach to kilometers. WDM (wavelength division multiplexing) silicon photonics modules, using multiple wavelength laser arrays at the transmitter side, allow aggregating high speed optical signals into a single optical waveguide and fiber for longer reach interconnects at lower cost.

Despite disparities in requirement and technical implementation, grey light and WDM solutions can coexist to achieve different interconnect scenarios. For example, at the higher hierarchy levels such as the top-of-rack (ToR) and aggregated switches, or the inter-datacenter interconnects, the WDM solution can leverage higher-cost laser chips by using much less fiber (cable) counts and offering all optical passive routing. On the other hand, at the lower level more static point-to-point interconnects, grey light parallel optics is more cost effective and requires lower power budget. The disparity between the parallel and WDM solutions conventionally requires a conversion from single wavelength grey light to multiple wavelengths. Although this operation can be realized with different optical transceiver modules via O-E-O (optical-electrical-optical) two-stage conversion, this process is very costly and the power consumption on the electronics alone is very high, especially for high bit rates in which CDR (clock data recovery) and signal processing and regeneration are necessary.

SUMMARY

According to embodiments described herein, an all-optical silicon photonics-based wavelength conversion scheme is provided for conserving data signals in optical format without O-E-O (optical-electrical-optical) conversion. Silicon microring resonators are used to combine and separate different data signals of the same wavelength and optical pump signals of different wavelengths, as well as to select allocated spectrum and filter out harmonics after wavelength conversion. The networking and network function visualization features described herein can be enhanced by providing more level-1 (L-1) features such as wavelength and modulation format transparency, elastic optical spectrum and dynamic spectrum allocation. Wavelength based routing can also be implemented to realize certain level-2 (L-2) features via all-optical packet switching.

According to an embodiment of a wavelength converter, the wavelength converter comprises first silicon waveguides and second silicon waveguides intersecting the first silicon waveguides to form an arrayed waveguide. The arrayed waveguide is configured to receive optical data signals at the same wavelength at a first input and optical pump signals at different wavelengths at a second input. The wavelength converter further comprises microring resonators evanescently coupling different ones of the first silicon waveguides to different ones of the second silicon waveguides. Each microring resonator is tuned to the wavelength of the optical data signals or one of the wavelengths of the optical pump signals, so that different combinations of the optical data signals and the optical pump signals are provided at an output of the arrayed waveguide. The wavelength converter also comprises a non-linear optical media configured to convert the wavelength of each combined optical signal at the output of the arrayed waveguide to yield wavelength converted signals each having a new dedicated wavelength.

According to an embodiment of a method of wavelength conversion, the method comprises: receiving optical data signals at the same wavelength at a first input of an arrayed waveguide and optical pump signals at different wavelengths at a second input of the arrayed waveguide, the arrayed waveguide comprising first silicon waveguides and second silicon waveguides intersecting the first silicon waveguides; evanescently coupling different ones of the first silicon waveguides to different ones of the second silicon waveguides via microring resonators, each microring resonator tuned to the wavelength of the optical data signals or one of the wavelengths of the optical pump signals, so that different combinations of the optical data signals and the optical pump signals are provided at an output of the arrayed waveguide; and converting the wavelength of each combined optical signal at the output of the arrayed waveguide to yield wavelength converted signals each having a new dedicated wavelength.

According to an embodiment of a method of manufacturing a wavelength converter, the method comprises: forming first silicon waveguides and second silicon waveguides intersecting the first silicon waveguides to form an arrayed waveguide; forming microring resonators at regions of the arrayed waveguide where the first and second silicon waveguides intersect, so that the microring resonators evanescently couple different ones of the first silicon waveguides to different ones of the second silicon waveguides, each microring resonator designed to be tuned to a wavelength of optical data signals or a wavelength of optical pump signals input to one or both of the silicon waveguides; coupling a non-linear optical media to an output of the arrayed waveguide; testing the arrayed waveguide to determine whether any of the microring resonators is mistuned to the wavelength for which it was designed; and storing results of the testing in memory, the stored results indicating which of the microring resonators is mistuned.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 4, which includes

FIG. 7, which includes

FIGS. 11A through 11C, is a schematic diagram of different embodiments of cascaded microring coupling regions of an all-optical wavelength converter and having individually-controllable bandwidths.

DETAILED DESCRIPTION

An all-optical wavelength converter is provided. The wavelength converter includes intersecting silicon waveguides and microring resonators that form an arrayed waveguide, and a non-linear media coupled to the output of the arrayed waveguide. Grey light (i.e. single wavelength) is converted to wavelength division multiplexing (WDM) optical signals by the all-optical wavelength converter. The all-optical wavelength converter eliminates the need for two-stage OEO by offering an all-optical conversion that is wavelength, polarization and data format transparent, and requires no additional electrical signal processing. The microring resonators included in the arrayed waveguide are used as routing and switching elements to rearrange and combine the ingress grey light parallel data signal lanes with a selected optical pump signal. The micro-ring resonators consume very little power and can offer variable tuning, enabling networking features which can be implemented at the hardware level and allows elastic optical networking and dynamic spectrum allocation for more efficient data aggregation in a single fiber. Wavelength conversion is accomplished in the nonlinear media coupled to the output of the arrayed waveguide. The wavelength converted signals each have a new dedicated wavelength and can be extracted by a respective microring resonator based element and combined with the other converted signals with different wavelengths.

Figure 1:
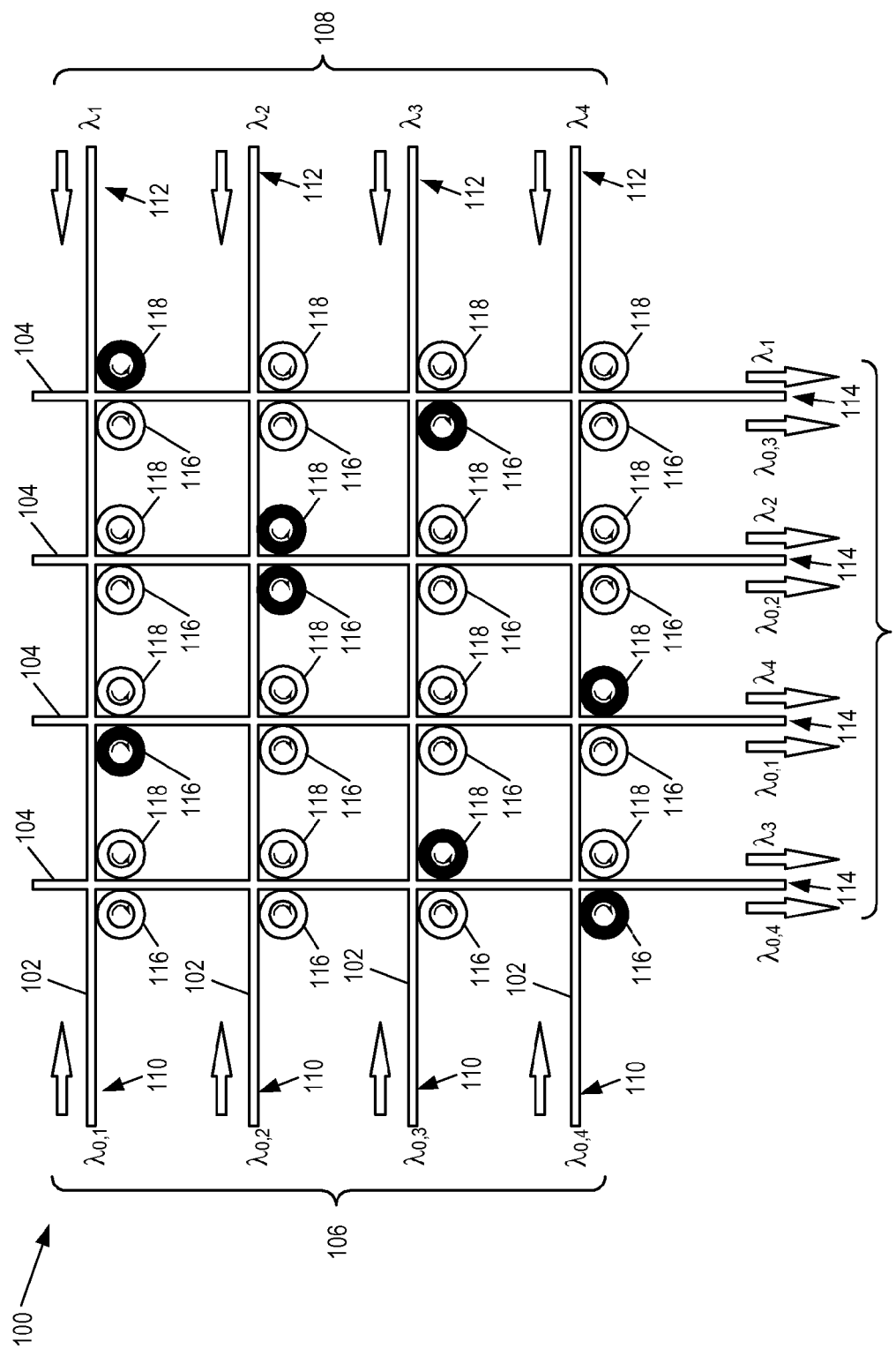
FIG. 1 is a schematic diagram of an embodiment of an arrayed waveguide included in an all-optical wavelength converter.

FIG. 1 illustrates an embodiment of the arrayed waveguide 100 of the all-optical wavelength converter. First silicon waveguides 102 are intersected by second silicon waveguides 104 to form the arrayed waveguide 100. The arrayed waveguide 100 receives grey light optical data signals ($\lambda 0,n$) at the same wavelength (represented by the index '0' along the left-hand side of FIG. 1) at a first input 106 and optical pump signals ($\lambda 1, \lambda 2, \lambda 3, \lambda 4$) at different wavelengths (represented by the indexes '1', '2', '3' and '4' along the right-hand side of FIG. 1) at a second input 108. According to the embodiment of FIG. 1, each of the first silicon waveguides 102 has a first end 110 for receiving one of the optical data signals and a second end 112 for receiving the optical pump signals at one of the different wavelengths. The different combinations of the optical data signals and optical pump signals ($\lambda 0,4/\lambda 3$; $\lambda 0,1/\lambda 4$; $\lambda 0,2/\lambda 2$; $\lambda 0,3/\lambda 1$) egress a first end 114 of the second silicon waveguides 104. In the following, the term wavelength $\lambda=c/\omega$ is expressed as it is directly to wavelength conversion, usually the wavelength detuning $\Delta\lambda \ll \lambda$.

The arrayed waveguide 100 of the all-optical wavelength converter also includes microring resonators 116, 118 which evanescently couple different ones of the first silicon waveguides 102 to different ones of the second silicon waveguides 104 to yield different combinations of the optical data signals and the optical pump signals at the output 120 of the arrayed waveguide 100. Silicon photonics in general, and more particularly silicon on insulator (SOI), benefit from the high refractive index contrast (n) between silicon (nSi=~3.4-3.5) as a waveguide material, SiO2 (nSiO2=~1.4-1.5) as a buried oxide (BOX) substrate material, and air (nair≈1) or SiO2 as an up-cladding material. Light can be confined in the silicon sub-micron waveguide with very small bending radius without additional loss.

As the light propagates along a silicon waveguide, some power travels outside the waveguide in the cladding. The field that extends beyond the silicon waveguide is referred to as the evanescent field. The evanescent field can be used to couple light from one silicon waveguide to an adjacent waveguide, if the two (or more) waveguides are close enough so that the evanescent fields overlap.

In microrings (also commonly referred to as microdisks), waves travel around a cavity, which is evanescently coupled to either one or two waveguides. Electrical control of microrings is implemented either by controlling the charge carrier concentration of the cavity or through the local temperature of the cavity. Both effects facilitate shifting the cavity resonant wavelength through a change in the refractive index. In a microring resonator, high-speed optical data signals are modulated onto a continuous-wave (CW) light passing in a waveguide in close proximity to the ring. The wavelength of the channel being modulated can be set slightly off-resonance to realize on-off-keyed (OOK) light modulation, for example.

Figure 2:
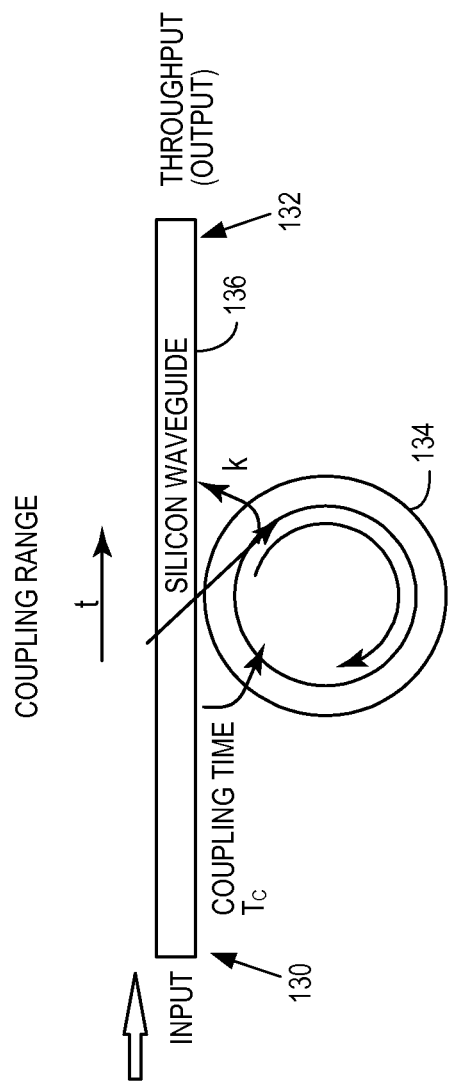
FIG. 2 is a schematic diagram of an embodiment of a microring coupling region of the arrayed waveguide of FIG. 1.

FIG. 2 illustrates input and throughput (output) paths 130, 132 for a single microring 134 evanescently coupled to one silicon waveguide 136. If the phase difference introduced in the microring 134 is a multiple of $2\pi$, the microring 134 resonates for the wavelength that satisfies this condition. Assuming L is the ring circumference and n is the microring effective index, then the condition of resonance is n*L=N*A, in which N is a positive integer and A is the resonant wavelength.

Silicon microring resonators can be as small as a few microns in radius due to the high refractive index contrast. The resonant condition as described is, $\lambda=n*L/N$, where N is positive integer and $n_g=n-\partial n/\partial \lambda$ are the resonant wavelength and group indexes, respectively. The bandwidth $\delta\lambda$ of the microring resonator 134 can be critically controlled by the cavity-guide coupling rate k. The free spectral range (FSR) is defined FSR=$\Delta\lambda \approx \lambda^2/n_g L$ (L>>$\lambda$) between two successive cavity resonances. The resonant wavelength index $n_g$ can be used instead of the effective index n to obtain more accurate values. In either case, the quality factor of a microring is defined as Q=$\lambda/\delta\lambda$. The different light coupling paths are illustrated with arrows in FIG. 2.

Figure 3:
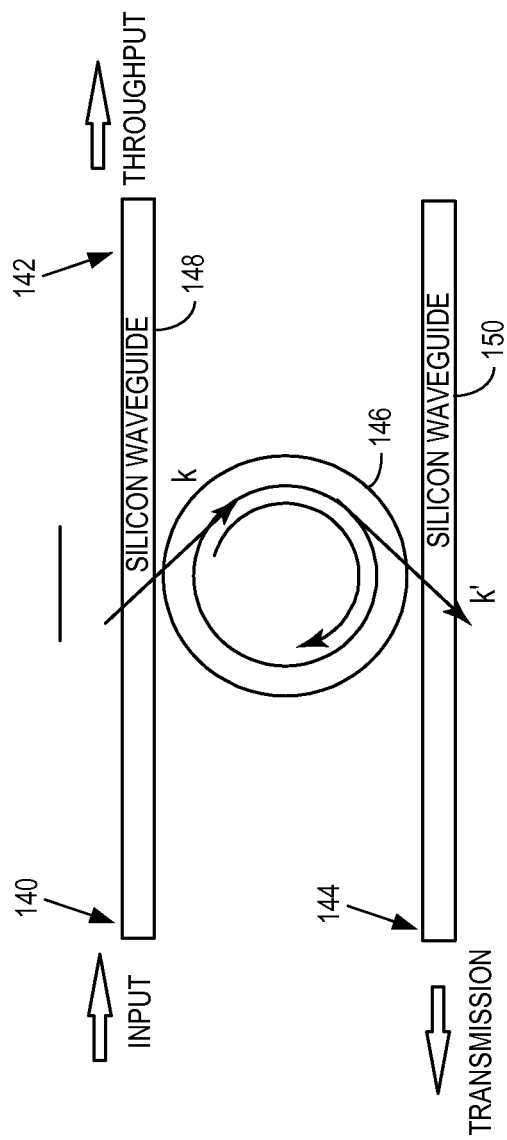
FIG. 3 is a schematic diagram of another embodiment of a microring coupling region of the arrayed waveguide of FIG. 1.

FIG. 3 illustrates input, throughput and transmission paths 140, 142, 144 for a single microring 146 evanescently coupled to two different silicon waveguides 148, 150. Based on this throughput-transmission (i.e. add-drop) configuration, the round trip intrinsic power loss ratio is $\alpha(\le 1)$, and the power coupling efficiency to the throughput and transmission paths 142, 144 are k and k', respectively. After each round trip, the optical power circulation in the microring 146 is reduced by a factor of G$\approx$(1-$\alpha$)(1-k)(1-k'). The full width at half-maximum bandwidth 2$\delta\lambda$ can be expressed by 2$\delta\lambda \approx (\pi n_g L)^{-1} \lambda_0^2 \ln [1/G]$ where $\lambda_0$ and $n_g=n-\partial n/\partial \lambda$ are the resonant wavelength and group indexes, respectively. Any tuning of the loss or coupling results in a change in the bandwidth $\delta\lambda$. If k=k', then $2\delta\lambda \approx (\pi n_g L)^{-1} \lambda_0^2 k^2$. The microring resonator bandwidth can therefore be controlled by ring dimension, ring material, and coupling efficiency k. The different light coupling paths are illustrated with arrows in FIG. 3.

Returning to the arrayed waveguide 100 of FIG. 1, each microring resonator 116, 118 is tuned to one of the single wavelength of the optical data signals or one of the wavelengths of the optical pump signals so that different combinations of the optical data signals and the optical pump signals can be provided at the output 120 of the arrayed waveguide 100. The tuned microring resonators 116, 118 are illustrated as filled rings and the un-tuned microring resonators 116, 118 are illustrated as unfilled rings. For example, the filled microring resonator 116 disposed at the intersection of the first row and second column of silicon waveguides 102, 104 is tuned to the wavelength ($\lambda$0) of the first incoming optical data signal ($\lambda$0,1) and the filled microring resonator 118 disposed at the intersection of the first row and fourth column of silicon waveguides 102, 104 is tuned to the first wavelength ($\lambda$1) of the optical pump signal. All other microring resonators 116, 118 disposed at intersections along the first row of the arrayed waveguide 100 are unfilled because they are not tuned to either the incoming data or pump signals injected into the first row of the waveguide 100 in this example. The bandwidth of each microring resonator 116, 118 is determined by its intrinsic loss and coupling with the input and/or output ports 110, 112 of the corresponding silicon waveguide 102. The bandwidth of a single microring resonator 116, 118 is $2\delta\lambda \approx (\pi n_g L)^{-1} \lambda_0^2 k^2$.

Figure 4A:
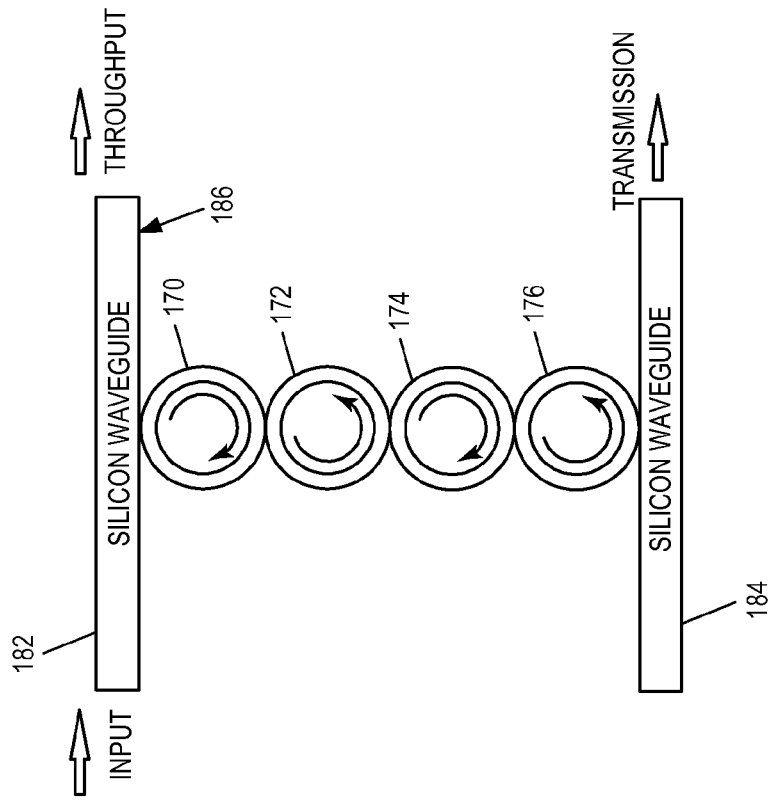
FIGS. 4A and 4B, is a schematic diagram of different embodiments of a cascaded microring coupling region of the arrayed waveguide of FIG. 1.
Figure 4B:
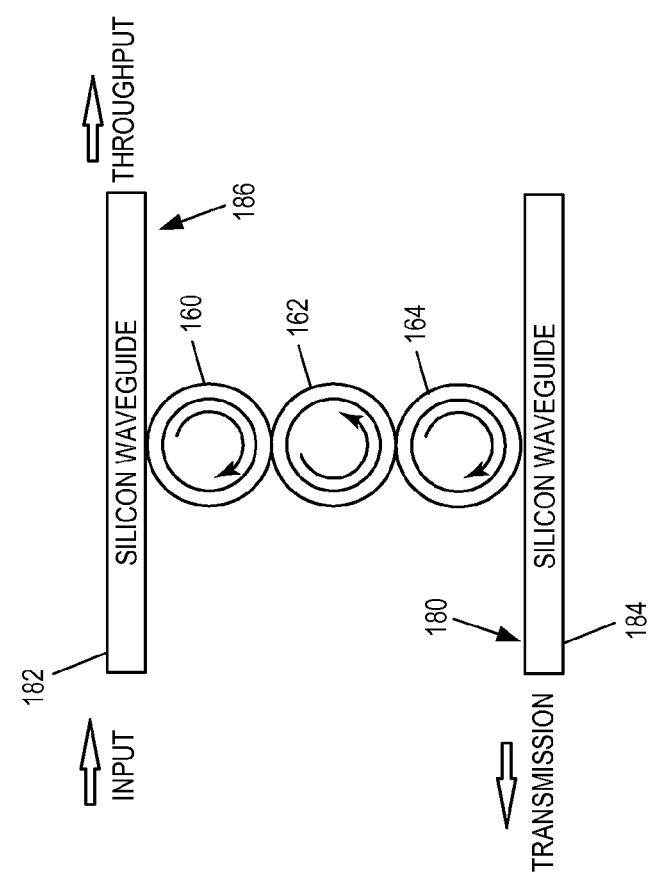

FIG. 4A illustrates three microrings 160, 162, 164 of the same cavity size evanescently cascaded together, and FIG. 4B illustrates four microrings 170, 172, 174, 176 of the same cavity size also evanescently cascaded together. The direction of the light coupled into each microring is indicated by curved arrows in FIGS. 4A and 4B.

In general with N microrings of the same cavity size evanescently cascaded together, the corresponding bandwidth can be reduced to $2\delta\lambda \approx (\pi n_g NL)^{-1} \lambda_0^2 k^2$. The transmission port 180 of the waveguides 182, 184 coupled to such an evanescently cascaded arrangement of microrings passes the resonant wavelength $\lambda_1, \lambda_2, \lambda_3, \lambda_4 \ldots$, while the rest of the spectral elements egress via the throughput port 186 of the waveguides 182, 184.

By cascading multiple microrings with different radii, a larger FSR can be realized than is achievable by using a single microring or evanescently cascaded microrings having the same radii. The combined FSR for two different radii is FSR=N·FSR1=M·FSR2 where N and M are natural and co-prime numbers. Thermal heaters, PN junctions and/or PIN junctions can be effectively used to trim the resonance of each single microring/cascaded microring arrangement, allowing wavelength selective filtering and on/off switching for a given wavelength.

Figure 5:
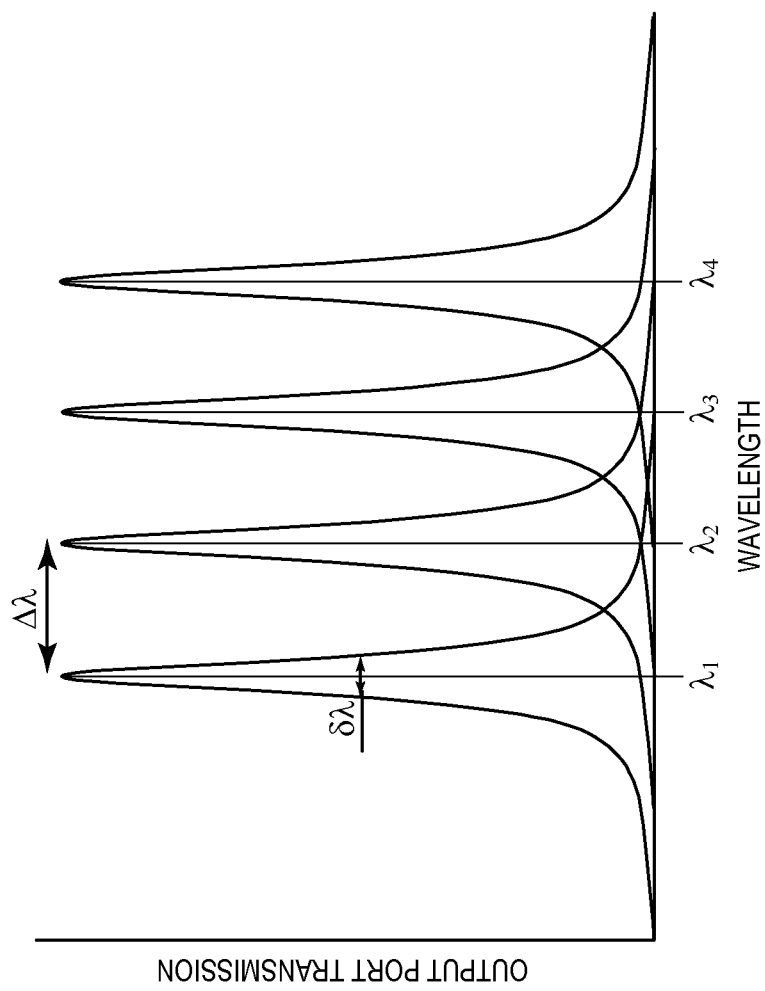
FIG. 5 is a plot diagram showing the output port transmission response of four optical microring resonators of the arrayed waveguide of FIG. 1 that are resonant at different wavelengths.

FIG. 5 for example shows the output port transmission response for four optical microring resonators that are resonant at different wavelengths $\lambda_1, \lambda_2, \lambda_3$, and $\lambda_4$. The microring resonator bandwidth can be controlled by ring dimension, ring material, coupling efficiency k, the number of microrings cascaded together, etc. For example, thermal control of the ring refractive index can be implemented to tune or adjust the filter transfer function. The radial frequency shift $\Delta\omega$ induced by a temperature variation $\Delta T$ is given by $\Delta\omega=\Delta T\, K\omega_0/n_{\mathit{eff}}$, where K is the thermo-optic coefficient, $\omega_0$ is the ring resonant frequency, and $n_{\mathit{eff}}$ is the effective ring refractive index.

Nonlinear effects can be used to implement all-optical processing and circumvent conventional OEO interfaces, mitigating the limitation of typical electronic circuits. A variety of material platforms are capable of strong four-wave-mixing (FWM) for use in all-optical processing, including highly nonlinear fiber, semiconductor optical amplifiers, chalcogenide waveguides, silicon waveguides, and silicon-organic waveguides.

Figure 6:
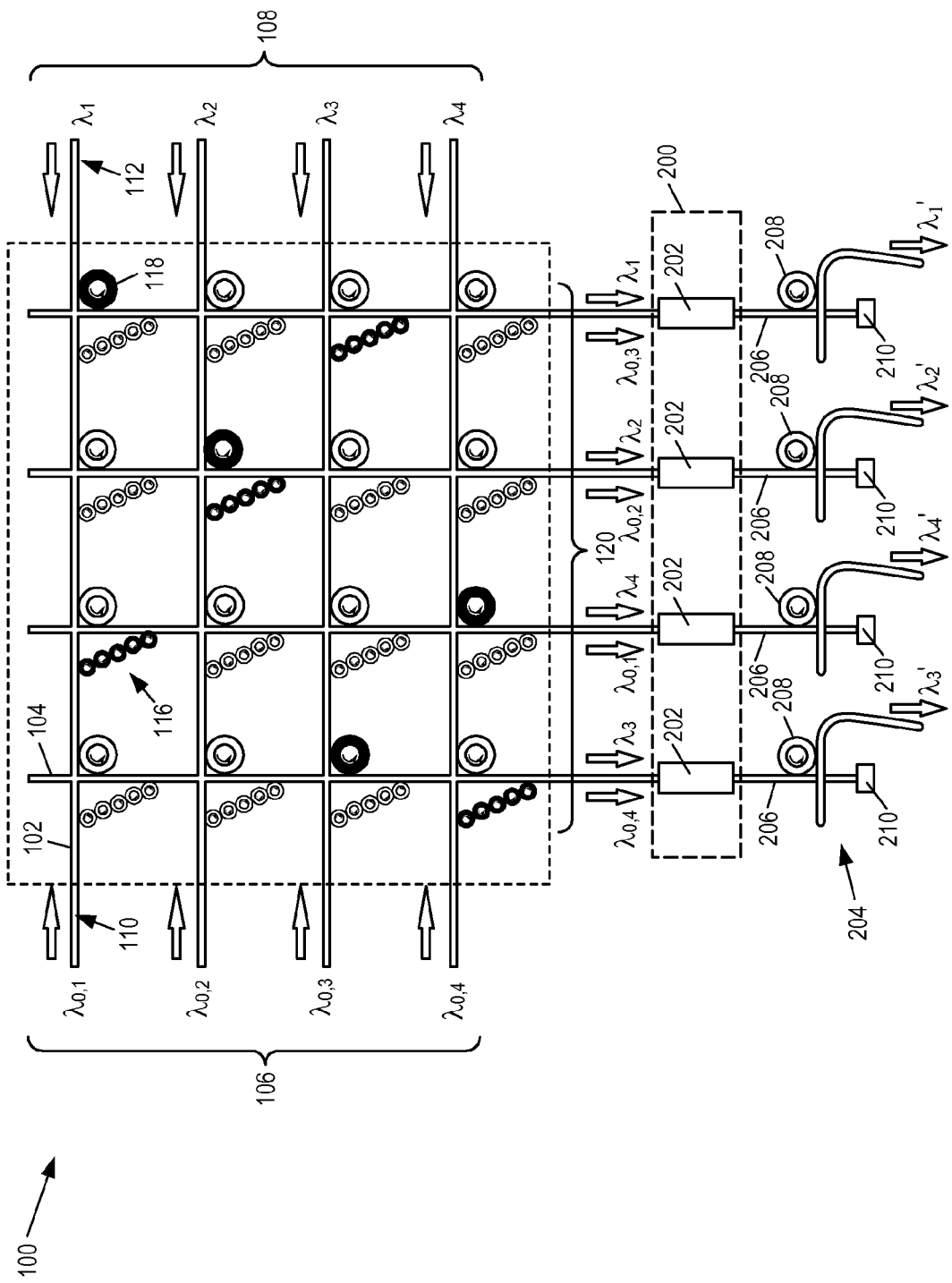
FIG. 6 is a schematic diagram of an embodiment of an all-optical wavelength converter.

FIG. 6 illustrates an embodiment of an all-optical wavelength converter including the arrayed waveguide 100 of FIG. 1 and a non-linear optical media 200. The non-linear optical media 200 converts the wavelength of each combined optical signal ($\lambda$0,4/$\lambda$3; $\lambda$0,1/$\lambda$4; $\lambda$0,2/$\lambda$2; $\lambda$0,3/$\lambda$1) at the output 120 of the arrayed waveguide 100 to yield wavelength converted signals each having a new dedicated wavelength ($\lambda_n$' where n indicates the converted signal index). The non-linear optical media 200 can include highly nonlinear fibers, semiconductor optical amplifiers, chalcogenide waveguides, silicon waveguides, and/or silicon-organic waveguides 202.

For example Si nanowire waveguides, typically with cross sections of <0.1 $\mu m^2$, have very large third-order nonlinear optical susceptibility of single crystal silicon. This is enhanced by strong optical confinement, and requires relatively lower optical power to achieve strong nonlinear optical effects, with device lengths on the order of a few hundreds microns to millimeters. Furthermore, the dispersion can be controlled by the exact geometry of the cross-section area due to such ultra-small dimensions, thus enabling precise control of the nonlinear optical functionalities.

Figure 7A:
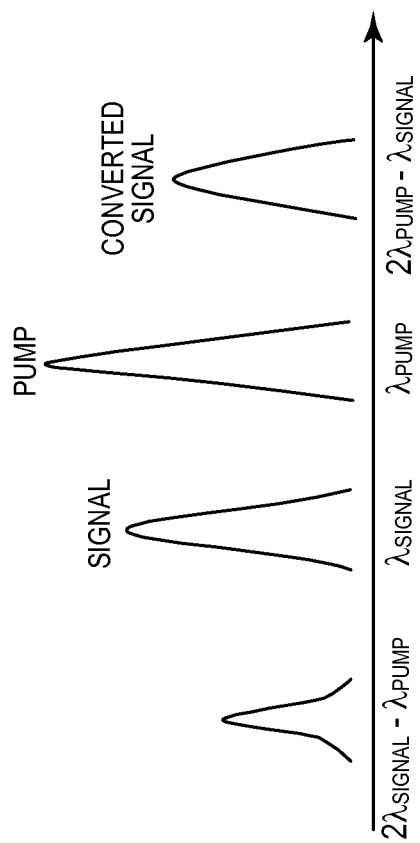
FIGS. 7A and 7B, is a plot diagram of the wavelength conversion range for single-pump and dual-pump embodiments of an all-optical wavelength converter.

Dispersion enhanced silicon nanowire waveguides can support efficient nonlinear optical processing, which provides a CMOS compatible platform for wavelength conversion that achieves simple, low cost fabrication and high density integration with state-of-the-art CMOS electronics and other CMOS photonics devices. For instance, the FWM mechanism is a third-order nonlinearity interaction between two or more wavelengths, resulting in a few new wavelength elements. The conversion efficiency is determined by three mechanisms: carrier density modulation; dynamic carrier heating; and spectral hole burning. For example, the presence of an optical signal at frequency $\omega_{signal}$ and an optical pump signal at frequency $\omega_{pump}$ in a nonlinear media results in two new frequency elements $2\omega_{pump}-\omega_{signal}$ and $2\omega_{signal}-\omega_{pump}$, and other higher order terms but with much smaller intensity as shown in FIG. 7A. Typically when a single optical pump is used, $\omega_{converted}=2\omega_{pump}-\omega_{signal}$.

Figure 7B:
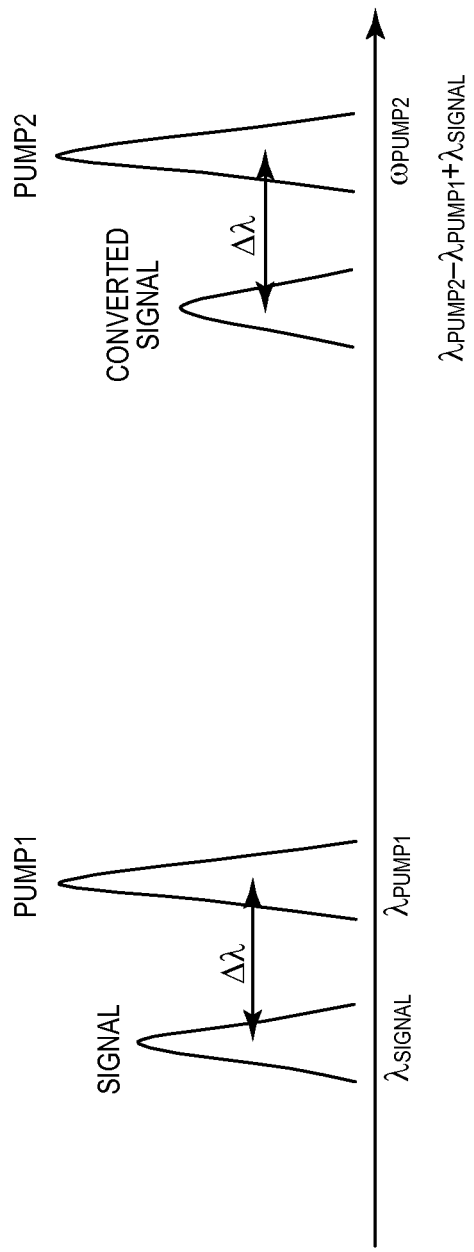

In another embodiment where parallel dual pumps are used to extend the wavelength conversion range as described in more detail later herein, the converted signal frequency is $\omega_{converted}=\omega_{pump2}-\omega_{pump1}+\omega_{signal}$ as shown in FIG. 7B. Many higher order FWM terms are omitted in FIGS. 7A and 7B as they can be readily filtered out after the wavelength conversion. The converted signals can be extracted and amplified at the output stage 204 of the wavelength converter. In one embodiment, additional silicon waveguides 206 receive the wavelength converted signals from the non-linear optical media 200. Additional microring resonators 208 are evanescently coupled to the additional silicon waveguides 206. The additional microring resonators 208 filter the wavelength converted signals based on the new dedicated wavelength ($\lambda_1'$, $\lambda_2'$, $\lambda_3'$, $\lambda_4'$) of each wavelength converted signal. A photodiode or other type of optical signal monitor 210 can be provided at the end of each additional silicon waveguide 206.

In FIG. 6, grey light parallel data signals with the same wavelength $\lambda 0$ are labelled $\lambda 0,1$, $\lambda 0,2$, $\lambda 0,3$, $\lambda 0,4$ at the left-hand side of FIG. 6 and a WDM pump signal with 4 different wavelengths are labelled $\lambda 1$, $\lambda 2$, $\lambda 3$, $\lambda 4$ at the right-hand side of FIG. 6. The 'filled' microring resonators 116 in a given row of the arrayed waveguide 100 are tuned at the left side of each corresponding waveguide crossing, based on a data traffic routing command, to be combined with a dedicated pump wavelength. Each dedicated pump wavelength is also selectively tuned, but by a 'filled' microring resonator 118 at the right side of the corresponding waveguide crossing. The combined data signal-pump pair in this example is ($\lambda 3$, $\lambda 0,4$), ($\lambda 4$, $\lambda 0,1$), ($\lambda 2$, $\lambda 0,2$), ($\lambda 1$, $\lambda 0,3$).

For each microring resonator 116, 118 that acts as a two-state switch ('throughput' for horizontal propagation and 'transmission' as vertical redirection, as previously described herein with regard to FIGS. 2 through 4), the tuning range requirement $\lambda_T$ is small as the ingress grey light signal wavelength and the WDM pump wavelengths are known. For example in the first row of the arrayed waveguide 100, the microrings 116 at the left side of each crossing range from $\lambda_{0,1}$ to $\lambda_{0,1}+\lambda_T$ (or $\lambda 0,1-\lambda_T$) and the microrings 118 at the right side of each crossing range from $\lambda_1$ to $\lambda_1+\lambda_T$ (or $\lambda_1-\lambda_T$).

However, the adjacent microring pair at the waveguide crossing point may induce severe interference as the light could be coupled into the undesired microring. As such, a cascaded microring solution that avoids overlapped evanescent coupling can be used as shown in FIG. 6. The cascaded microring resonators 116 function as wavelength selective switches e.g. as previously described herein with regard to FIGS. 4A and 4B. In more detail, the microring resonators 116 tuned to the wavelength of the optical data signals can be arranged in different groups of cascaded microring resonators. Adjacent ones of the cascaded microring resonators 116 of the same group are evanescently coupled to one another. Each group of cascaded microring resonators 116 evanescently couples one of the first silicon waveguides 102 to one of the second silicon waveguides 104 through the cascaded microring resonators 116 included in that group. The microrings 118 for the WDM pump signal can also be arranged in a cascaded manner if needed, e.g. if FSR or the resonator bandwidth needs to be adjusted. The same principle applies for the filtering microrings 208 after wavelength conversion.

Figure 8:
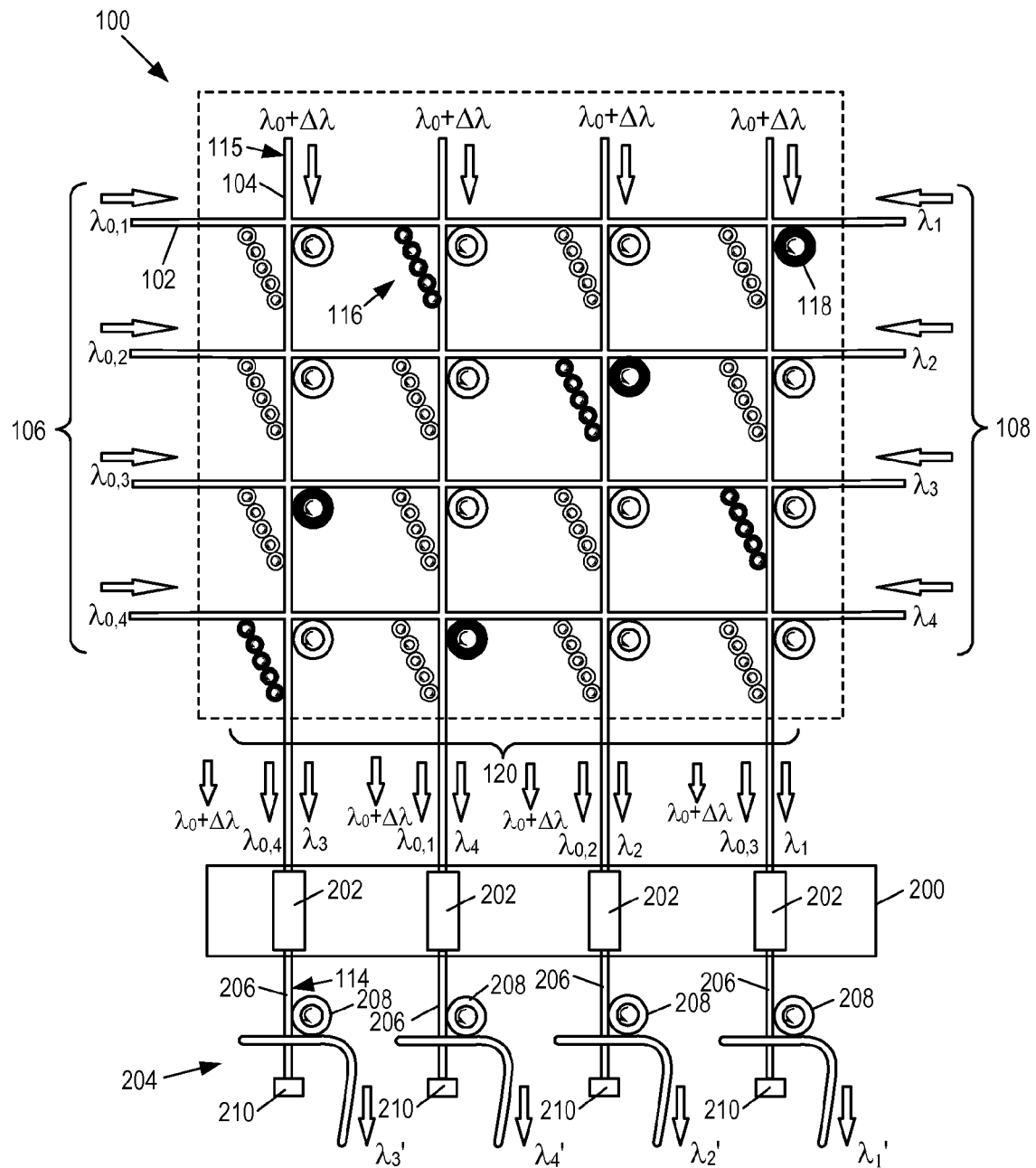
FIG. 8 is a schematic diagram of another embodiment of an all-optical wavelength converter.

FIG. 8 illustrates another embodiment of an all-optical wavelength converter including an arrayed waveguide 100 and a non-linear optical media 200. The embodiment of FIG. 8 is similar to the embodiment shown in FIG. 6, however, a dual-pump scheme is used to extend the wavelength tuning range. According to this embodiment, a second pump laser array (not shown for ease of illustration) is set at a fixed wavelength $\lambda_0+\Delta\lambda$ to improve wavelength conversion efficiency. As with the previous embodiments described herein, the microring resonance shift is very small, allowing 'throughput' and 'transmission' switching of the ring resonance aligned with the selected data signal and pump wavelength, and minimizing for instance, thermal crosstalk between adjacent ring or ring arrays. According to the embodiment of FIG. 8, each of the second silicon waveguides 104 has a second end 115 opposite the first end 114 for receiving additional optical pump signals of a fixed wavelength ($\lambda_0+\Delta\lambda$) which is slightly offset from the wavelength ($\lambda_0$) of the optical data signals ($\lambda_0$,n). The microring resonators 116 tuned to the wavelength of the optical data signals are also tuned to the fixed wavelength of the additional optical pump signals so that different combinations of the optical data signals, the optical pump signals and the additional optical pump signals ($\lambda_0+\Delta\lambda/\lambda 0,4/\lambda 3$; $\lambda_0+\Delta\lambda/\lambda 0,1/\lambda 4$; $\lambda_0+\Delta\lambda/\lambda 0,2/\lambda 2$; $\lambda_0+\Delta\lambda/\lambda 0,3/\lambda 1$) are present at the output 120 of the arrayed waveguide 100.

The second pump laser array can be a WDM pump laser tunable within a certain wavelength range. The microring resonators 116, 118 can also be fabricated with a certain wider wavelength tuning range so as to allow a more flexible wavelength conversion range and spectrum allocation. Also with regard to the dual-pump scheme, the converted signals carry the same phase information as the original signals, as compared to the single pump scheme in which the converted signal has an inversed spectrum, i.e. de-phased by $\pi$, as shown in FIGS. 7A and 7B. The signal-pump configurations and wavelength conversion mechanisms are not exclusive. That is, the functional building blocks described herein can also be implemented with other approaches and configurations.

In the single pump scheme, the converted signal wavelengths are $\lambda_3'=2\lambda_3-\lambda_{0,4}$, $\lambda_4'=2\lambda_4-\lambda_{0,1}$, $\lambda_2'=2\lambda_2-\lambda_{0,2}$, $\lambda_1'=2\lambda_1-\lambda_{0,3}$. The original signal wavelength is the same grey light, i.e., $\lambda_{0,1}=\lambda_{0,2}=\lambda_{0,3}=\lambda_{0,4}=\lambda_0$.

In the dual pump scheme, the converted signal wavelengths are $\lambda_3'=\lambda_3-\Delta\lambda$, $\lambda_4'=\lambda_4-\Delta\lambda$, $\lambda_2'=\lambda_2-\Delta\lambda$, $\lambda_1'=\lambda_1-\Delta\lambda$. In both schemes, if a WDM laser array with equal spectrum spacing is used, the converted signal can fit into a WDM equally spaced grid. As both ingress signal rearrangement and WDM pump rearrangement stages are adopted, the device can offer more flexible wavelength arrangement on each lane for direct wavelength dependent routing, e.g. with an array waveguide grating router (AWGR).

Figure 9:
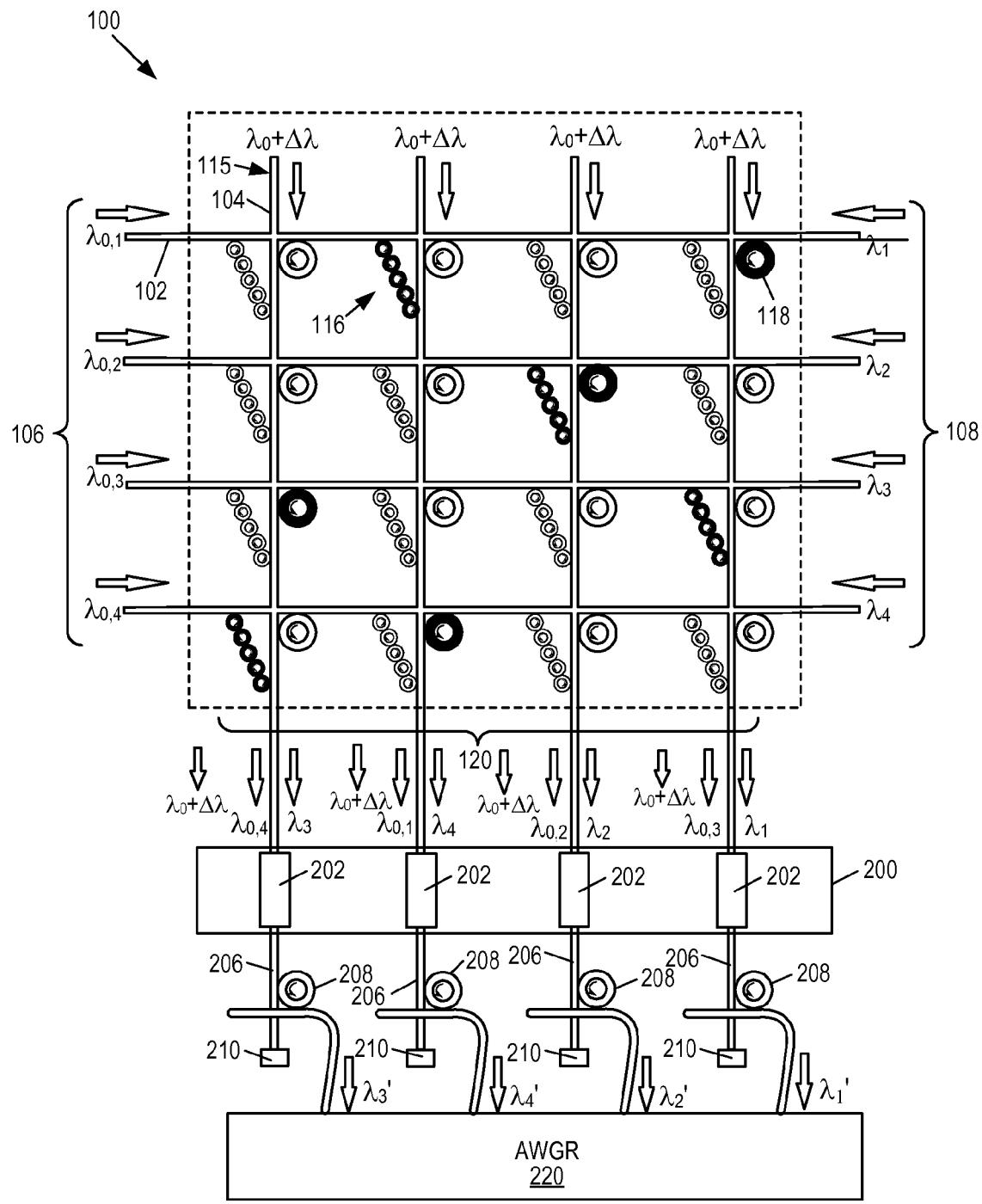
FIG. 9 is a schematic diagram of yet another embodiment of an all-optical wavelength converter.

FIG. 9 illustrates another embodiment of an all-optical wavelength converter including an arrayed waveguide 100 and a non-linear optical media 200. The embodiment of FIG. 9 is similar to the embodiment shown in FIG. 8, however, the wavelength converted signals are connected directly to an AWGR device 220 for routing. Also, the ingress grey light signal rearrangement and the WDM pump arbitrary distribution to each ingress signal is not necessary if, at the egress port, all the converted signals are aggregated into a single fiber. Either ingress signal rearrangement or WDM pump rearrangement is sufficient and simplifies the single-pump combiner stage.

Figure 10:
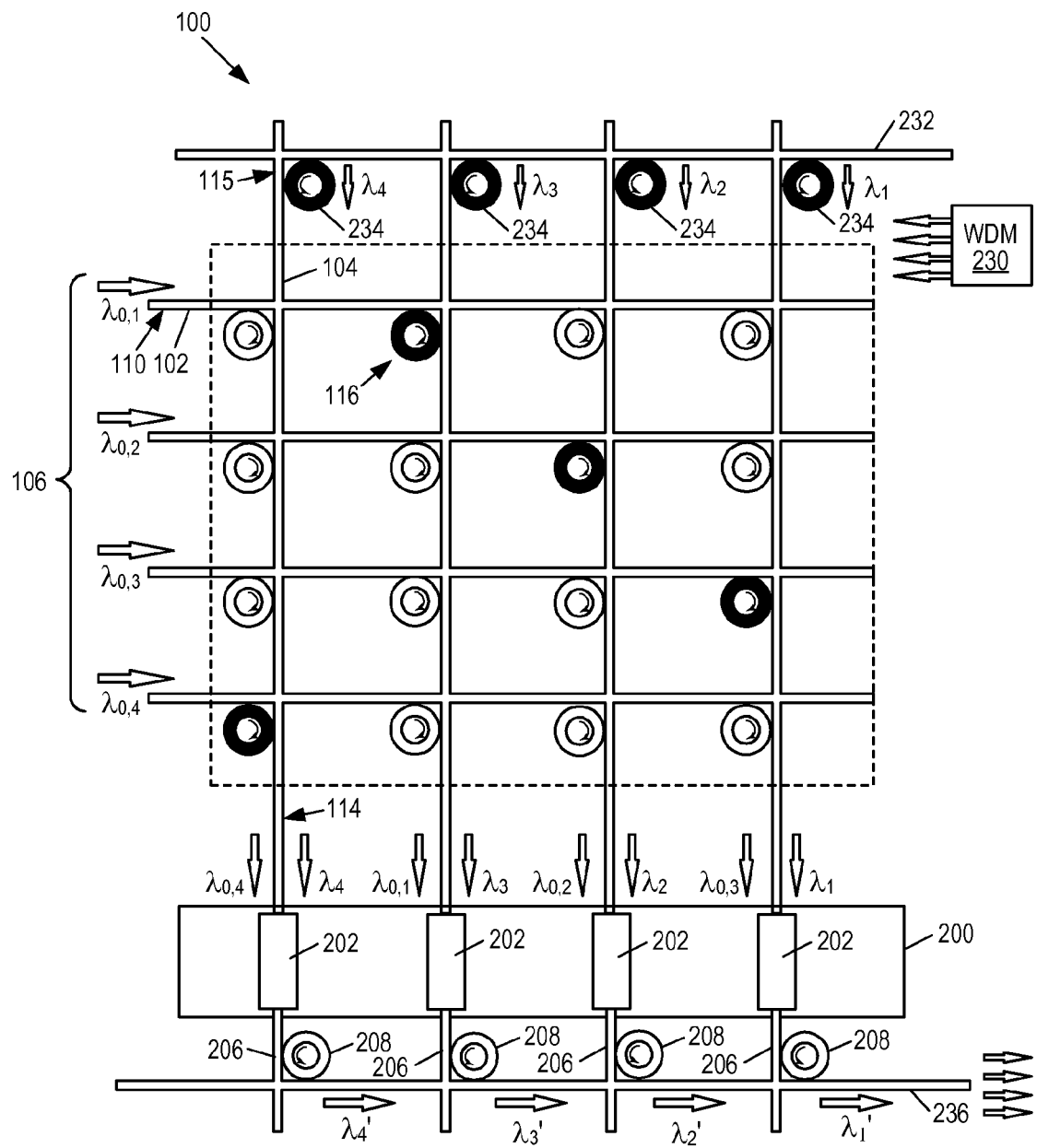
FIG. 10 is a schematic diagram of still another embodiment of an all-optical wavelength converter.

FIG. 10 illustrates yet another embodiment of an all-optical wavelength converter including an arrayed waveguide and a non-linear optical media. The embodiment of FIG. 10 is similar to the embodiment shown in FIG. 6, however, microring resonators 116 are provided on each row of the arrayed waveguide 100 only for evanescently coupling the grey light data signals and not the WDM pump signal. According to the embodiment of FIG. 10, each of the first silicon waveguides 102 has an end 110 for receiving one of the optical data signals and each of the second silicon waveguides 104 has an end 115 for receiving one of the optical pump signals at one of the different wavelengths. The different combinations of the optical data signals and optical pump signals (λ0,4/λ4; λ0,1/λ3; λ0,2/λ2; λ0,3/λ1) egress an opposite end 114 of the second silicon waveguides 104.

According to this embodiment, a WDM pump laser source 230 such as a flip-chip multiple wavelength laser array, an embedded multiple wavelength laser, or an externally supplied multiple wavelength laser source is coupled to the arrayed waveguide 100 via a single mode fiber 232 and injects the optical pump signals at different wavelengths into the corresponding second silicon waveguides 104. This can be, for instance, an externally provisioned light source via a single mode fiber that combines multiple single wavelength lasers, or mode-locked quantum dot comb lasers. In the case of external laser sources, microring resonators 234 can also be used to separate the different wavelengths to be used as pumps. Also the wavelength converted signals can be combined into a single fiber 236 via additional microring resonators 208 tuned to the respective wavelengths ($\lambda_1^1, \lambda_2^1, \lambda_3^1, \lambda_4^1$) of the converted signals, or coupled directly to an AWGR as previously described herein with regard to FIG. 9.

With regard to each of the embodiments described herein, the bandwidth of each microring resonator can be controlled by the number of cascaded microrings and the ring coupling efficiency, e.g. by independent heaters and ring size. The bandwidth is determined by the microring dimensions and the number of cascaded microrings. The spectrum window of a particular microring or cascaded microring arrangement can be tuned. In order to tune the bandwidth and position of the spectrum window e.g. as an elastic and selective filter, different microring or cascaded microring arrangements can be used on each intersection of the arrayed waveguide. Additionally, a combination of different microring sizes in a row can also add to the bandwidth tuneability.

Figure 11:
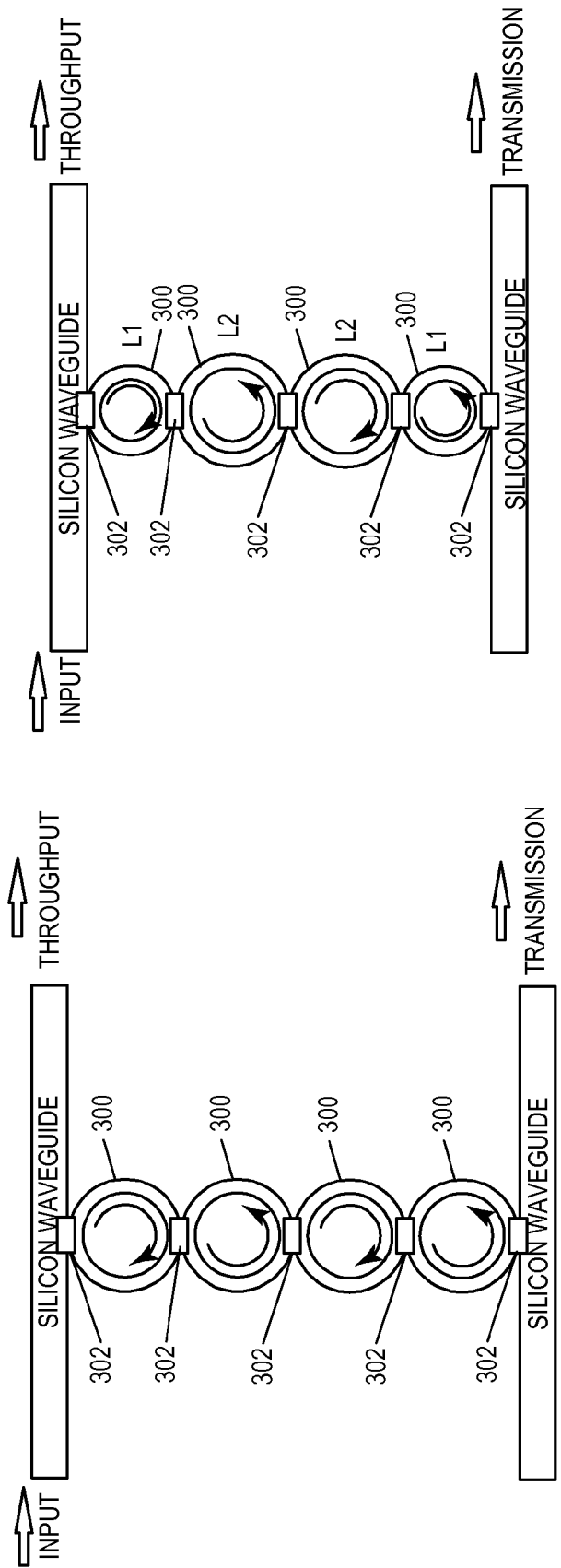
FIG. 11, which includes

FIG. 11, which includes FIGS. 11A through 11C, illustrates different embodiments of microring resonators 300 having individually-controllable bandwidths. In FIG. 11A, a cascaded arrangement of microring resonators 300 is shown. Each microring resonator 300 includes a device 302 such as a heater, PN junction or PIN junction for changing at least one of the coupling ratio, free spectral range and resonance frequency of the corresponding microring resonator 300. In the case of a heater, a heater element can be implemented by a layer of metal disposed under or over the respective microring 300 and operable to heat that microring 300 by increasing the current in the metal layer. The cascaded arrangement of microring resonators in FIG. 11A includes microring resonators 300 of the same size.

In FIG. 11B, the cascaded arrangement of microring resonators includes microring resonators 300 of different circumferences (L1, L2) for adjusting the bandwidth of the cascaded microring arrangement. The group of cascade microring resonators shown in FIG. 11A could be used to evanescently couple a first one of the first silicon waveguides 102 to a first one of the second silicon waveguides 104 in a first region of the arrayed waveguide 100 at a first bandwidth. The group of cascade microring resonators shown in FIG. 11B could be used to evanescently couple a second one of the first silicon waveguides 102 to a second one of the second silicon waveguides 104 in a second region of the arrayed waveguide 100 at a second bandwidth. The first and second bandwidths are different because the two groups of cascade microring resonators utilize microring resonators 300 of different sizes. In another embodiment, the first group of microring resonators can have a different number of microring resonators than the second group of microring resonators e.g. as shown in FIGS. 4A and 4B so that the first bandwidth is different than the second bandwidth.

In FIG. 11C, microring resonators 300 are cascaded in parallel for bandwidth and FSR control. The microring resonators 300 can include a device 302 such as a heater, PN junction or PIN junction for changing at least one of the coupling ratio, free spectral range and resonance frequency of the corresponding microring resonator 300 as previously described herein.

In general, different microring resonator designs can be used on the same arrayed waveguide grid to allow elastic optical bandwidth distribution over the available spectrum, as although the ingress grey light data signals have the same wavelength, their bit rates, bandwidth, and modulation formats can vary. Such elastic optical bandwidth distribution better utilizes the available spectrum based on the characteristics of the individual data signals.

Figure 12:
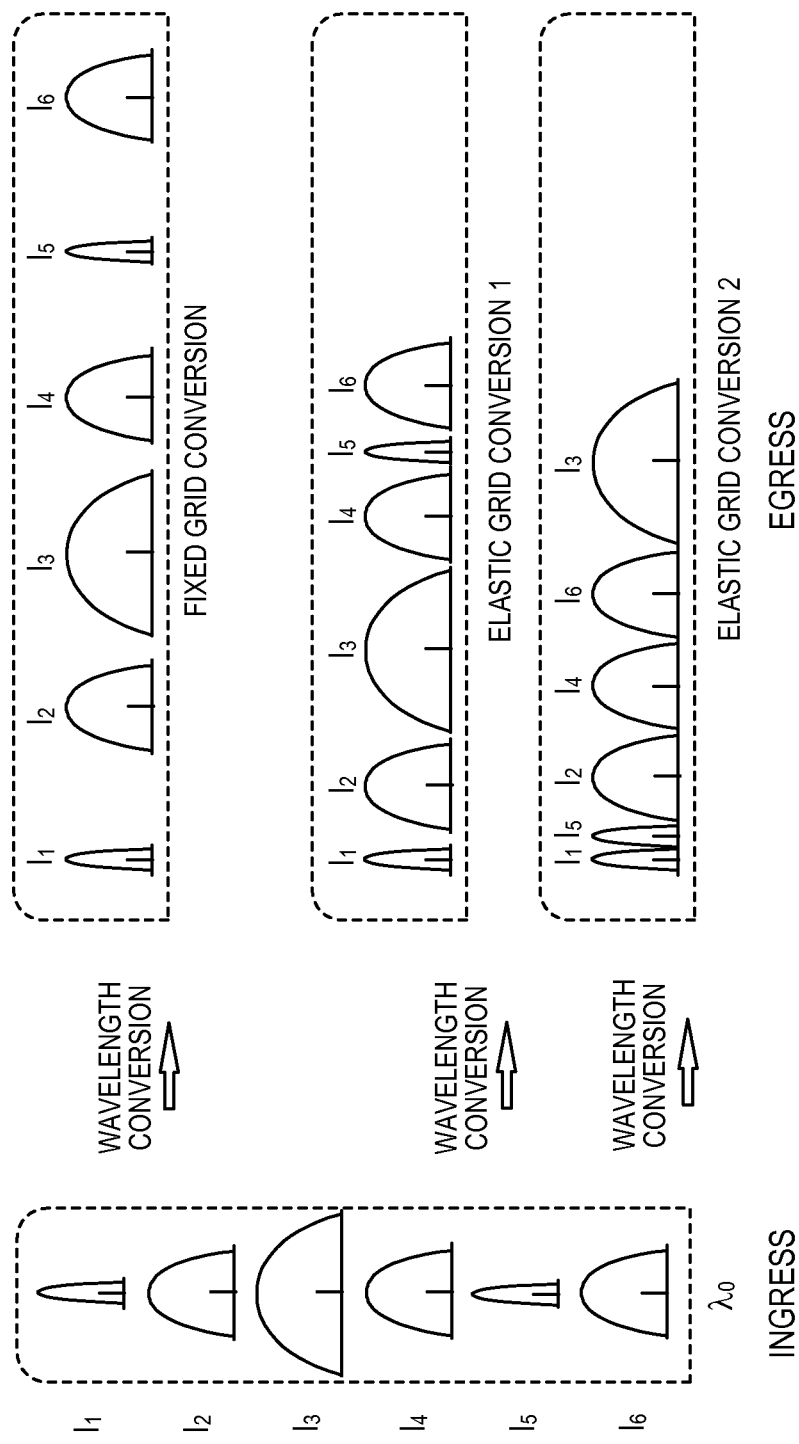
FIG. 12 is a schematic diagram comparing a fixed grid conversion technique between ingress grey light parallel data signals to a WDM fixed grid wavelength, and elastic optical bandwidth provisioning technique for high spectrum efficiency.

FIG. 12 illustrates an exemplary comparison between fixed grid conversion technique between ingress grey light parallel data signals to a WDM fixed grid wavelength and elastic optical bandwidth distribution technique for high spectrum efficiency. The ingress signals (In) can carry various modulation types, bit rates, and spectrum bandwidth, and the wavelength converter described herein can dynamically redistribute the ingress grey light signal over a wide range of spectrum e.g. in compliance with network specification and transmission requirements. That is, the wavelength converter described herein can allocate wavelength and dedicated passband for each ingress data flow based on the overall traffic status and data patterns.

In more detail, the left-hand side of FIG. 12 shows six ingress grey light parallel data signals (In) of the same wavelength (λ0). The upper wavelength conversion illustrated in FIG. 12 represents a fixed grid conversion between the ingress grey light parallel data signals to a WDM fixed grid wavelength. The fixed grid conversion technique is best suited when the spectral bandwidth is abundant and low cost fixed wavelength pumps and simplistic on-off microring resonators for grey light and WDM pumps can be used with a simplified design, e.g. as shown in FIG. 10. However a substantial amount of the available spectrum does go unused with the fixed grid conversion technique, because the ingress grey light parallel data signals have different bandwidths (BWn) which are not accounted for by the fixed grid conversion technique.

The middle wavelength conversion illustrated in FIG. 12 represents the use of an elastic optical bandwidth distribution technique for limited bandwidth and low cost comb WDM grid fixed wavelength pump applications. While tunable bandwidth microring resonators can be used to avoid high bandwidth ingress signal distortion, a selection of the WDM grid wavelength pumps instead can be used to perform the wavelength conversion. The spectrum efficiency improves considerably compared to the fixed grid conversion.

The bottom wavelength conversion illustrated in FIG. 12 represents the use of an elastic optical bandwidth distribution technique for very limited bandwidth availability. Any suitable wavelength-tunable laser source can be used as pumps to allow fine wavelength allocation. This embodiment yields the highest spectrum efficiency, but can be the most complex and costly.

WDM laser source as pumps for wavelength conversion can be supplied externally via optical fiber as previously described herein. This facilitates various conversion scenarios. By simply reconfiguring the microring array parameters, an upgraded grey light parallel transmitter to WDM elastic spectrum converter with aggregated channel can be provided. Furthermore, the signal-pump combiner components and the nonlinear media can be replaced in case of a system upgrade without replacing the other infrastructure. Also an optical amplifier such as a semiconductor optical amplifier (SOA), erbium doped optical amplifier (EDFA) or Raman optical amplifier can be used to operate at linear regime to amplify and adjust the combined WDM signals, where appropriate.

Figure 13:
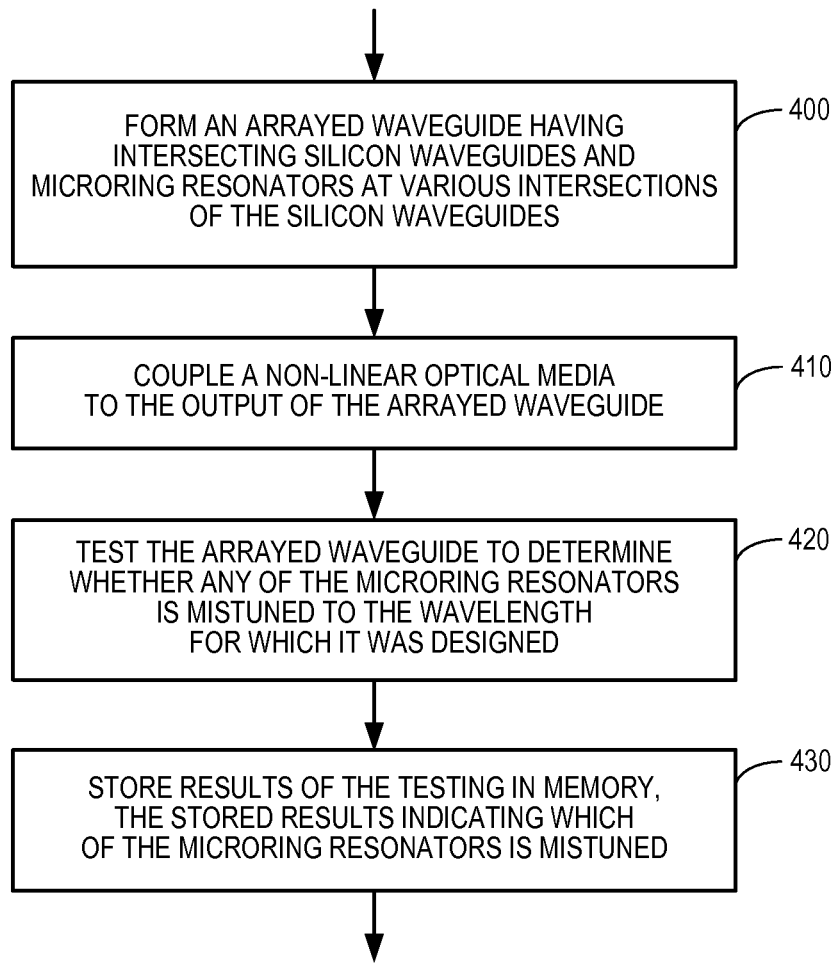
FIG. 13 is a diagram of an embodiment of a method of manufacturing an all-optical wavelength converter.

FIG. 13 illustrates an embodiment of a method of manufacturing the wavelength converter described herein. The method includes forming the arrayed waveguide 100 having intersecting silicon waveguides 102, 104 and microring resonators 116, 118 at various intersections of the silicon waveguides 102, 104, and coupling a non-linear optical media 200 to the output 120 of the arrayed waveguide 100 (Block 400). The method further includes testing the arrayed waveguide 100 to determine whether any of the microring resonators 116, 118 is mistuned to the wavelength for which it was designed (Block 410). Any suitable optical testing technique can be used. The method also includes storing results of the testing in memory (Block 420). The stored results indicate which of the microring resonators 116, 118 is mistuned. Later in the field any mistuned microring resonators 116, 118 can be corrected, e.g. by using a heater, PN junction or PIN junction to change the bandwidth of each mistuned microring resonator 116, 118. In addition or alternatively, a TEC (thermoelectric cooler) can be attached to the wavelength converter for performing bandwidth-related temperature adjustments.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A wavelength converter, comprising:
   first silicon waveguides;
   second silicon waveguides intersecting the first silicon waveguides to form an arrayed waveguide, the arrayed waveguide configured to receive optical data signals at the same wavelength at a first input and optical pump signals at different wavelengths at a second input;
   microring resonators evanescently coupling different ones of the first silicon waveguides to different ones of the second silicon waveguides, each microring resonator tuned to the wavelength of the optical data signals or one of the wavelengths of the optical pump signals, so that different combinations of the optical data signals and optical pump signals are provided at an output of the arrayed waveguide, wherein each combined optical signal has a composite wavelength comprising the wavelength of the optical data signal and one of the wavelengths of the optical pump signals; and
   a non-linear optical media configured to convert the composite wavelength of each combined optical signal at the output of the arrayed waveguide to yield wavelength converted signals each having a new dedicated wavelength.

2. The wavelength converter of claim 1, wherein each of the first silicon waveguides has a first end for receiving one of the optical data signals and a second end for receiving the optical pump signals at one of the different wavelengths, and wherein the different combinations of the optical data signals and optical pump signals egress a first end of the second silicon waveguides.

3. The wavelength converter of claim 2, wherein each of the second silicon waveguides has a second end opposite the first end for receiving additional optical pump signals of a fixed wavelength that is offset from the wavelength of the optical data signals, and wherein the microring resonators tuned to the wavelength of the optical data signals are also tuned to the fixed wavelength of the additional optical pump signals so that different combinations of the optical data signals, the optical pump signals and the additional optical pump signals are present at the output of the arrayed waveguide.

4. The wavelength converter of claim 1, wherein each of the first silicon waveguides has a first end for receiving one of the optical data signals, wherein each of the second silicon waveguides has a first end for receiving the optical pump signals at one of the different wavelengths, and wherein the different combinations of the optical data signals and optical pump signals egress a second end of the second silicon waveguides opposite the first end.

5. The wavelength converter of claim 1, wherein the microring resonators tuned to the wavelength of the optical data signals are arranged in different groups of cascaded microring resonators, wherein adjacent ones of the cascaded microring resonators of the same group are evanescently coupled to one another, and wherein each group of cascaded microring resonators evanescently couples one of the first silicon waveguides to one of the second silicon waveguides through the cascaded microring resonators included in that group.

6. The wavelength converter of claim 1, further comprising:
   third silicon waveguides for receiving the wavelength converted signals from the non-linear optical media; and
   additional microring resonators evanescently coupled to the third silicon waveguides and configured to filter the wavelength converted signals based on the new dedicated wavelength of each wavelength converted signal.

7. The wavelength converter of claim 1, wherein the optical pump signals are input to the second silicon waveguides via a single mode fiber coupled to a laser source operable to generate the optical pump signals.

8. The wavelength converter of claim 1, wherein at least some of the microring resonators include heaters operable to change at least one of the coupling ratio, free spectral range and resonance frequency of the corresponding microring resonator by heating that microring resonator.

9. The wavelength converter of claim 1, wherein at least some of the microring resonators include a PN or PIN junction operable to change at least one of the coupling ratio, free spectral range and resonance frequency of the corresponding microring resonator.

10. The wavelength converter of claim 1, wherein the wavelength converted signals are combined into a single fiber or coupled directly to an AWGR (array waveguide grating router).

11. The wavelength converter of claim 1, wherein the microring resonators tuned to the wavelength of the optical data signals have individually-controllable bandwidths.

12. The wavelength converter of claim 1, wherein a first group of the microring resonators evanescently couple a first one of the first silicon waveguides to a first one of the second silicon waveguides in a first region of the arrayed waveguide at a first bandwidth, and a second group of the microring resonators evanescently couple a second one of the first silicon waveguides to a second one of the second silicon waveguides in a second region of the arrayed waveguide at a second bandwidth different than the first bandwidth.

13. The wavelength converter of claim 12, wherein the first group of microring resonators has a different number of microring resonators than the second group of microring resonators so that the first bandwidth is different than the second bandwidth.

14. The wavelength converter of claim 12, wherein the first group of microring resonators has different sized microring resonators than the second group of microring resonators so that the first bandwidth is different than the second bandwidth.

15. A method of wavelength conversion, the method comprising:
receiving optical data signals at the same wavelength at a first input of an arrayed waveguide and optical pump signals at different wavelengths at a second input of the arrayed waveguide, the arrayed waveguide comprising first silicon waveguides and second silicon waveguides intersecting the first silicon waveguides;
evanescently coupling different ones of the first silicon waveguides to different ones of the second silicon waveguides via microring resonators, each microring resonator tuned to the wavelength of the optical data signals or one of the wavelengths of the optical pump signals, so that different combinations of the optical data signals and the optical pump signals are provided at an output of the arrayed waveguide, wherein each combined optical signal has a composite wavelength comprising the wavelength of the optical data signal and one of the wavelengths of the optical pump signals; and
converting the composite wavelength of each combined optical signal at the output of the arrayed waveguide to yield wavelength converted signals each having a new dedicated wavelength.

16. The method of claim 15, wherein receiving the optical data signals at the first input of the arrayed waveguide and the optical pump signals at the second input of the arrayed waveguide comprises:
coupling the optical data signals to a first end of the first silicon waveguides; and
coupling the optical pump signals to a second end of the first silicon waveguides opposite the first end, so that the different combinations of the optical data signals and optical pump signals egress a first end of the second silicon waveguides.

17. The method of claim 16, further comprising:
receiving additional optical pump signals of a fixed wavelength that is offset from the wavelength of the optical data signals at a second end of the second silicon waveguides opposite the first end, and
wherein the microring resonators tuned to the wavelength of the optical data signals are also tuned to the fixed wavelength of the additional optical pump signals so that different combinations of the optical data signals, the optical pump signals and the additional optical pump signals are present at the output of the arrayed waveguide.

18. The method of claim 15, wherein receiving the optical data signals at the first input of the arrayed waveguide and the optical pump signals at the second input of the arrayed waveguide comprises:
coupling the optical data signals to a first end of the first silicon waveguides; and
coupling the optical pump signals to a first end of the second silicon waveguides, so that the different combinations of the optical data signals and optical pump signals egress a second end of the second silicon waveguides opposite the first end.

19. The method of claim 15, further comprising:
coupling the wavelength converted signals to third silicon waveguides; and
filtering the wavelength converted signals based on the new dedicated wavelength of each wavelength converted signal via additional microring resonators evanescently coupled to the third silicon waveguides.

20. The method of claim 15, further comprising:
coupling the optical pump signals to the second silicon waveguides via a single mode fiber coupled to a laser source operable to generate the optical pump signals.

21. The method of claim 15, further comprising:
heating at least some of the microring resonators to change at least one of the coupling ratio, free spectral range and resonance frequency of those microring resonators.

22. The method of claim 15, further comprising:
individually controlling the bandwidth of the microring resonators tuned to the wavelength of the optical data signals.

23. A method of manufacturing a wavelength converter, the method comprising:
forming first silicon waveguides and second silicon waveguides intersecting the first silicon waveguides to form an arrayed waveguide;
forming microring resonators at regions of the arrayed waveguide where the first and second silicon waveguides intersect, so that the microring resonators evanescently couple different ones of the first silicon waveguides to different ones of the second silicon waveguides, each microring resonator designed to be tuned to a wavelength of optical data signals or a wavelength of optical pump signals input to one or both of the silicon waveguides;
coupling a non-linear optical media to an output of the arrayed waveguide;
testing the arrayed waveguide to determine whether any of the microring resonators is mistuned to the wavelength for which it was designed; and
storing results of the testing in memory, the stored results indicating which of the microring resonators is mistuned.

* * * * *